Aug. 27, 1968 J. Y. MA ET AL 3,399,362

TUNER HAVING UHF-VHF CHANGEOVER SWITCH

Filed April 1, 1965

5 Sheets-Sheet 1

Inventors:
John Y. Ma
Robert C. Baenziger
Christopher C. Hsiao

By John W. Gaines Atty.

TUNER HAVING UHF-VHF CHANGEOVER SWITCH

Filed April 1, 1965 5 Sheets-Sheet 2

Inventors:
John Y. Ma
Robert C. Baenziger
Christopher C. Hsiao
By John W. Gaines
Atty.

TUNER HAVING UHF-VHF CHANGEOVER SWITCH

Filed April 1, 1965 5 Sheets-Sheet 3

Inventors:
John Y. Ma
Robert C. Baenziger
Christopher C. Hsiao
By John W. Gaines Atty.

Inventors:
John Y. Ma
Robert C. Baenziger
Christopher C. Hsiao
By John W. Gaines Atty.

Aug. 27, 1968 J. Y. MA ET AL 3,399,362

TUNER HAVING UHF-VHF CHANGEOVER SWITCH

Filed April 1, 1965 5 Sheets-Sheet 5

Inventors:
John Y. Ma
Robert C. Baenziger
Christopher C. Hsiao
By John W. Gaines Atty.

United States Patent Office 3,399,362
Patented Aug. 27, 1968

3,399,362
TUNER HAVING UHF-VHF CHANGEOVER SWITCH

John Y. Ma, McHenry County, and Robert C. Baenziger and Christopher C. Hsiao, Carpentersville, Ill., assignors to Electro-Netic Steel, Inc., Schiller Park, Ill., a corporation of Illinois
Filed Apr. 1, 1965, Ser. No. 444,717
20 Claims. (Cl. 334—51)

ABSTRACT OF THE DISCLOSURE

Three section tuner adapted for UHF-VHF changeover, having plural aligned contact carried by a stationary UHF section, pluralities of selectable aligned contacts carried by a rotatable VHF turret section, and plural aligned contacts carried by an intermediate switch bar section, the bar being switchable selectively to electrically connect to the UHF or VHF section.

This application is continuing case of copending Ma et al. patent applications U.S. Ser. No. 408,064, No. 408,076 and No. 414,297 and the description of various tuner elements and other common matter disclosed in each of the latter is incorporated herein by reference.

Our invention relates to tuners which are primarily adapted to handle radio or television frequencies. It particularly relates to a tuner serving as the means directly to cover the commercial very high frequency (VHF) television band and used in conjunction with another means to cover the ultrahigh frequency (UHF) television band.

The present tuner comprises an interacting arrangement of a number of generally parallel tuner sections, a first of which consists of a rotatable, VHF channel selector section having at least one nonoperative (no VHF) position such as the channel 1 position, a second relatively stationary section which is spaced apart from the rotatable VHF selector section and which is the connector for applying the tuned output (literally the tuned and converted signal) from a UHF multichannel circuit and a third tuner section in the space between the first and second sections to serve the changeover switch function.

An object of our invention is to provide a three section tuner such as the foregoing, wherein the third section consists of a shiftable switch bar normally in an advanced position cooperating with the VHF section and carrying thereupon a cam driven follower by which the switch bar is shifted, and wherein the VHF section carries a first drive cam which is effective only at the time of the VHF section rotating into the channel 1 or nonoperative VHF position, and which at that time engages the follower on the switch bar to retract the switch bar into a position cooperating with the second or stationary section. The switch bar is connected in circuit with the so-called front end of a wave signal receiver, and is either operatively in a signal transfer relation for applying the tuned UHF output to the front end circuit when the switch bar is retractively cammed such as by the drive cam described, or operatively in a signal transfer relation with the VHF section when in the normal advanced position described.

Another object, in line with the objective stated in connection with the changeover type tuner when in the UHF signal transfer relation of the immediately preceding paragraph, is the provision of a second, restoring drive cam and a second cam driven follower which are carried by the respective rotatable VHF selector and switch bar sections and which, when activated by being brought into engagement during rotation of the selector section from any channel position into any other channel position except to channel 1, cause the switch bar section to resume its normal advanced position of cooperation with the selector section. Stated another way, the only result that can occur when the selector section is brought into the channel 1 position is that the switch bar section remains in or is forced into the corresponding retracted position, whereas when the selector section is brought into any other channel position but channel 1, the switch bar section remains in or is forced into the corresponding advanced position.

A further object, in line with the objective stated in connection with the bidirectionally, cam switched, television tuner of the immediately preceding paragraph, is the provision of bidirectional cams and cam driven follower means which are carried by, respectively, an independently rotary piece or structure and the switch bar structure and which, when activated by rotation in either direction of the independently rotary structure while the selector section is in any channel position except channel 1, cause the switch bar structure to change into the advanced or retracted position as desired. It is a feature of our invention that the bidirectional cams carried by the independently rotatable structure are entirely separate in operation from the first and second drive cams so that a choice of control is afforded, i.e., either the first drive cam or one of the bidirectional cams is optional for shifting the changeover switch bar structure into the retracted UHF position, whereas either the second drive cam or the other one of the bidirectional cams is optional for restoring the switch bar structure from its UHF position to the normal VHF position.

Another object, in line with the objective stated in the preceding paragraph, is to provide a first control knob and associated connecting shaft for operating the selector section, and a second control knob and associated connecting shaft for operating the independently rotary piece of the tuner, whereby the first control knob enables the viewer to change the receiver to assume a UHF setting by turning step by step to the channel 1 position, or to select a VHF channel by turning the tuner on a step by step basis to the particular VHF channel setting desired. Alternatively, the second control knob enables the viewer to turn the tuner directly to the UHF setting from whatever the selected VHF setting is originally, or to restore the tuner from the UHF setting directly to the original VHF setting. Direct switching in this manner between UHF-VHF settings avoids the steps of going through unnecessary intermediate VHF channel positions of the tuner as required when using the first control knob to make the VHF to UHF changeover.

A further object of our tuner invention, the structure thereof including the drive cam carrying, rotatable, selector section referred to, is to provide not one, but multiple second or restoring drive cams forming a cam ring on such selector section. According to a feature of our tuner, the multiple second drive cams are arranged on a combined drive cam and indexing disk which is fast to the selector section and which is engageable at circumferentially spaced apart points on its rotating periphery by the second follower means referred to and by a detent arm, respectively. For changeover purposes to UHF, the second follower means can thus be cammed out of a recess between any two successive cams in the cam ring on the indexing disk upon initial rotative movement of the selector section; for indexing purposes, the detent arm is biased into and lockingly seats within the nearest recess between successive drive cams on the indexing disk upon termination of rotative movement of the selector section. The detent arm has a wedging action between the cams, forcing the selector section to rotationally accommodate until the recess between cams is precisely indexed with respect to the arm.

Further features, objects, and advantages will either be specifically pointed out or become apparent when, for a better understanding of the invention, reference is made to the following written description, taken in conjunction with the accompanying drawings which show a preferred embodiment thereof and in which.

Figures 1, 2:
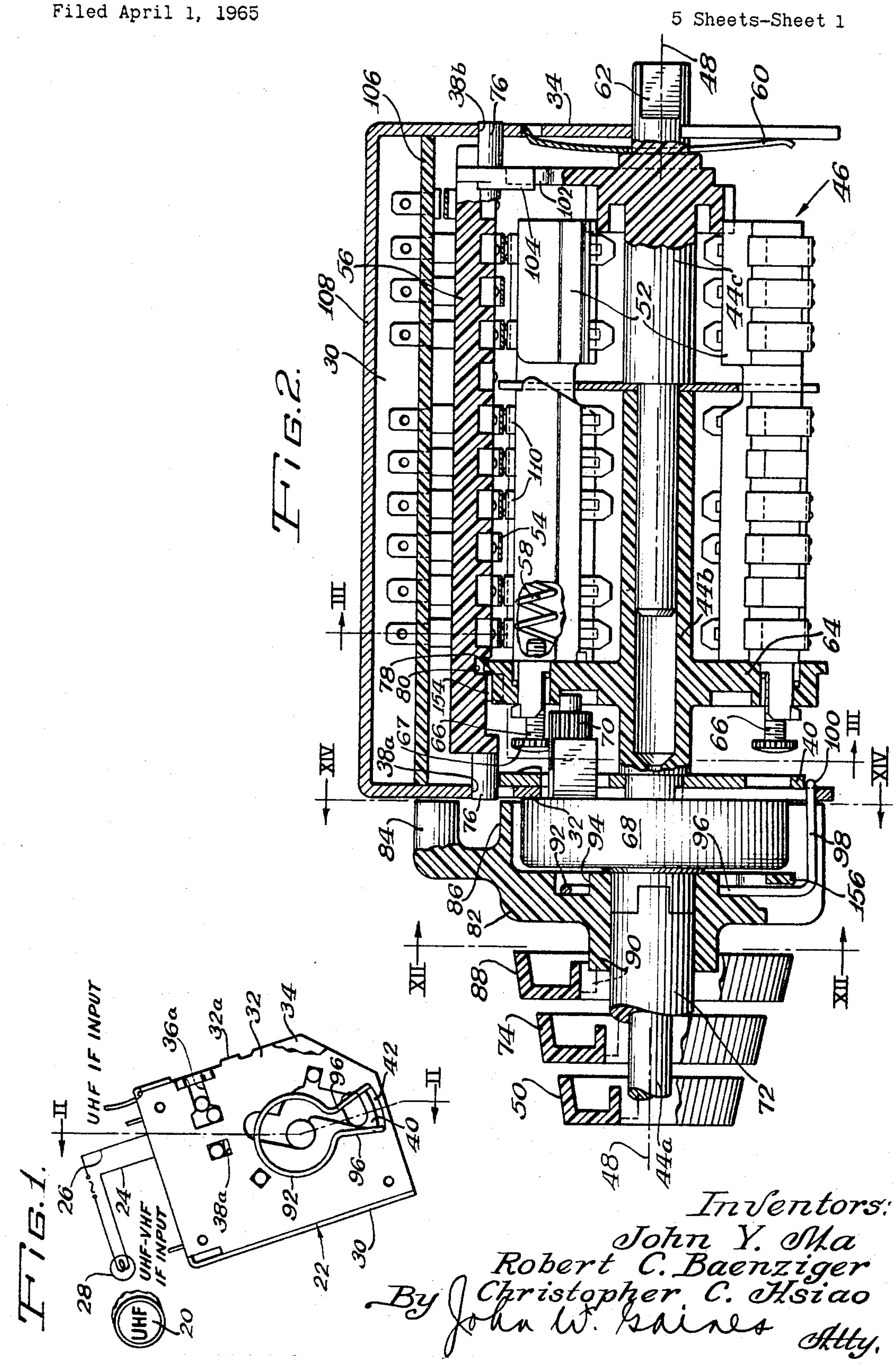
FIGURE 1 is a front end, elevational showing of a television tuner embodying the present invention, and with a portion of the showing of FIGURE 2 omitted.
FIGURE 2 is a longitudinal sectional view of the FIGURE 1 showing along the lines II—II thereof but to larger scale and inside elevation.
Figure 4:
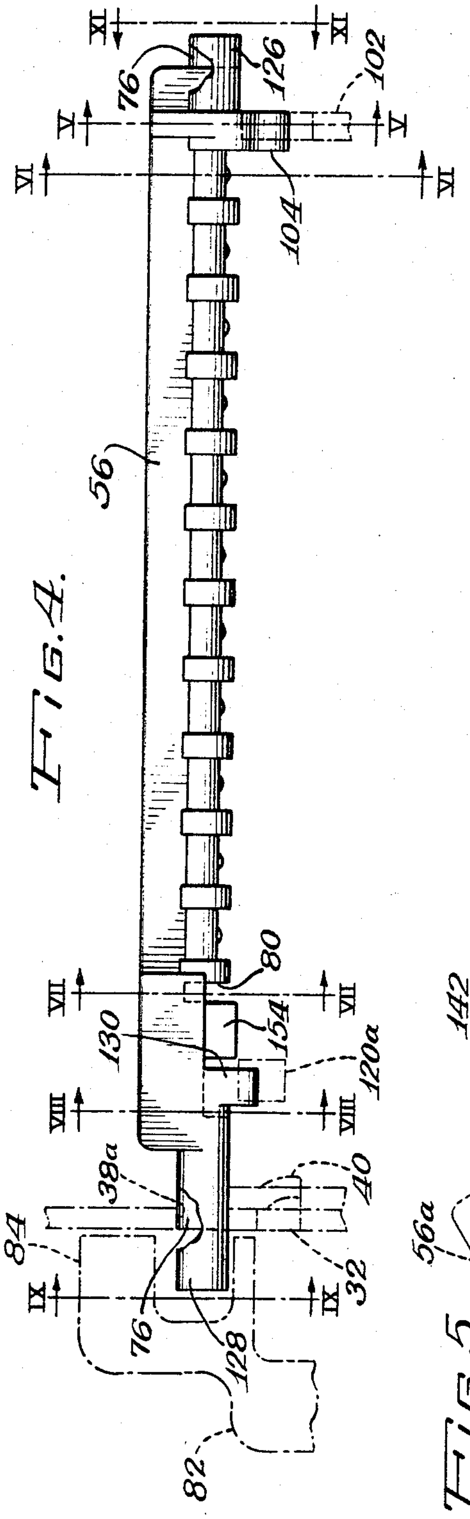
FIGURE 4 is restricted practically to one detail of FIGURE 2, showing the wiper bar in essentially the same attitude as it appears in FIGURE 2.
Figures 8, 9, 10, 11:
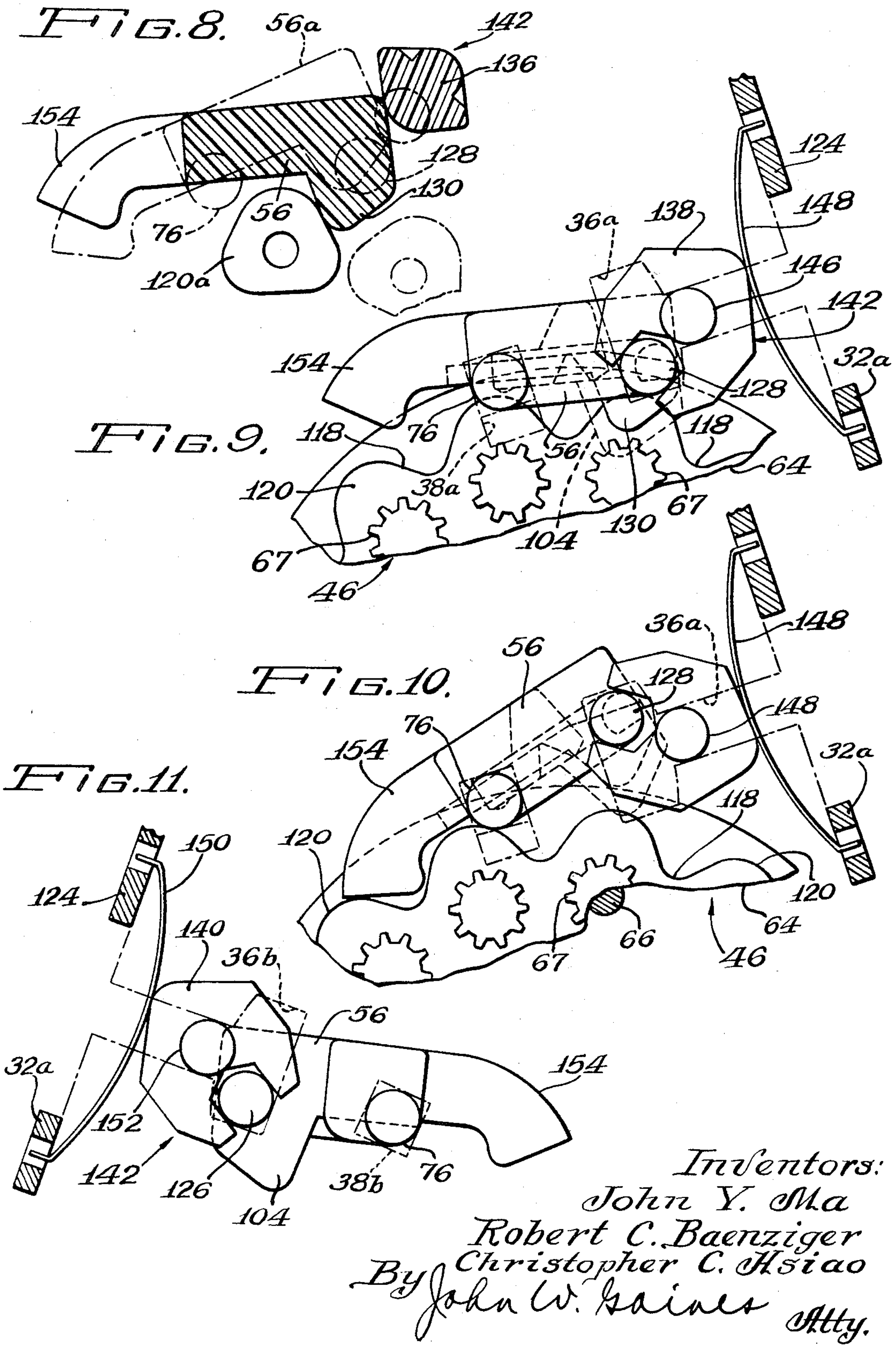
Figure 12:
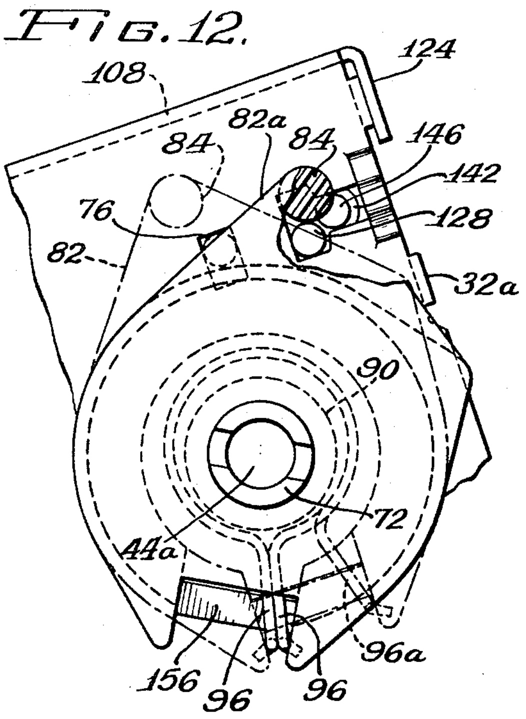
Figure 13:
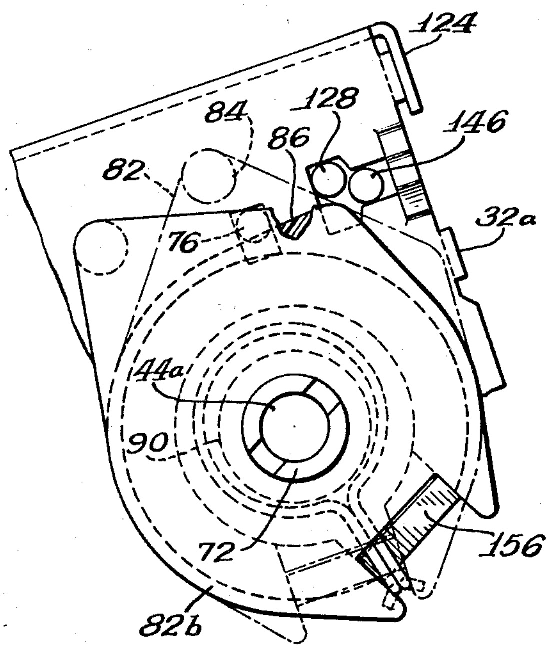
Figure 14:
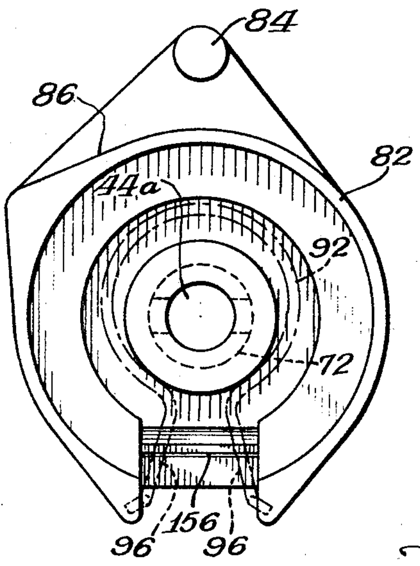

The transverse sectional views in FIGURES 5, 6, 7, 8, and 9 are taken along the lines V—V, VI—VI, VII—VII, VIII—VIII, and IX—IX, respectively, as viewed from the left in FIGURE 4;

FIGURE 10 is similar to FIGURE 9, but shows the wiper or switch bar following a shift from the advanced position into the retracted position thereof;

The transverse sectional view in FIGURE 11 is taken along the section lines XI—XI as viewed from the right in FIGURE 4;

FIGURE 12 is a front end view looking in the direction of the arrows on line XII—XII of FIGURE 2, but after the wiper bar has been restored into the advanced position;

FIGURE 13 is similar to FIGURE 12 but shows the wiper bar cammed into the retracted position; and FIGURE 14 is a transverse view taken along the section lines XIV—XIV of FIGURE 2, and showing the camming means centered.

More particularly in FIGURE 1 of the drawings, portions of a UHF-VHF television receiver are shown including the outside lens 20 of a UHF indicator lamp, and a tuner 22. A pair of wires 24 and 26 leads from fixed and movable switch contacts, not shown, which are in the tuner and which when engaged complete a circuit between an indicator lamp bulb 28 and a low power, AC source so as to illuminate the lens 20, indicating that the receiver is in the UHF setting.

The tuner 22 has a chassis including a longitudinal side wall 30 mechanically bridging between a front panel 32 and a rear panel 34 of the chassis. The front panel 32 has a T-slot **36*a* and a small bearing opening 38*a*, and the rear panel 34 has a similar T-slot 36*b* and a small bearing opening 38*b*, not shown, cooperating to support a wiper bar mechanism used for UHF-VHF changeover switching and constructed and operating in a manner hereinafter described. A backing panel 40 against the inside of the front panel 32 cooperates therewith to define an arcuate slot 42 adjacent the bottom of the front panel 32**.

In FIGURE 2, a front connecting shaft section **44*a*, a center section 44*b*, and a rear end section 44*c* are joined to form a unitary selector shaft. The shaft is journalled in bearings in the front and rear panels 32 and 34 of the chassis and supports therein the turret drum or selector section 46 to rotate on the longitudinal axis 48 of the tuner. The connecting shaft section 44*a* has a selector knob 50 fast thereto, enabling the viewer to rotate the selector section 46 to bring individual trough portions or channel strips 52 thereof to an upper position of alignment with a row of wiper springs 54 mounted on a wiper bar 56 in the top of the tuner. The tuning strips 52 are made of insulating material and are used as carriers for induction coils 58 by which to precisely tune in the television channels. The selector 46 is rotated on a step by step basis and has thirteen positions, of which the channel 1 position corresponds to a UHF setting and the positions 2 to 13**, inclusive, are normally VHF positions each preset to a different channel frequency.

A flat spring 60 which is in engagement with a shoulder on the rear section **44*c* of the selector shaft presses between the selector shaft and the rear panel 34 to prevent end play of the selector section 46 with respect to the tuner chassis. A flat 62 is provided on an extension of the rear section 44*c*** so as to form a drive coupling with a channel selector motor, not shown, with which the present tuner is adapted to be power tuned.

The center section **44*b* of the selector shaft includes thereon an integral indexing disk 64 carrying individual threaded tuning slugs 66 which are aligned with different ones of the tuning strips 52 on the selector section 46. A mechanism for presetting the fine tuning of the tuner is enclosed within a rotary housing 68 and supports an output pinion 70 for movement of translation between a radial inner and a radial outer position and/or for movement of rotation when in the radial outer position indicated in solid lines in FIGURE 2. In said solid line position, the teeth of the output pinion 70 drive the knurled input head 66 of whichever tuning slug 66 happens to be in adjacent vertically aligned relation therewith so as to pretune the associated tuning strip 52**.

An associated shaft 72 connects a pretuning knob 74 with the housing 68 of the pretuning mechanism. The viewer operates the coaxial adjacent knobs 50 and 74 in conjunction with one another to bring each respective VHF channel portion into operating position in the tuner and pretune the channel tuning strip operative in a receiver circuit in such position. Predetermined initial rotation of the rotary housing 68 in either direction shifts the output pinion outwardly between the dotted line and solid line positions illustrated so that threaded adjustment of the slug 66 can be made, and the mechanism and operation are disclosed and claimed in the referred to application Ser. No. 408,076.

The wiper bar 56 at its respective opposite ends carries a pair of coaxial trunnions 76 which are journalled in the respective openings **38*a* and 38*b* in the chassis panels and which enable the wiper bar to turn between operating positions in the tuner. The so-called wiper bar 56 is actually a switch bar performing the switching function for UHF-VHF changeover. The bar 56 is parallel to the selector section 46 and is referenced in its longitudinal position with respect to the selector section due to the interfit between a continuous radial rim 78 on the selector section indexing disk 78 and a complementary groove 80 in the wiper bar 56**.

Also in FIGURE 2, a rotary piece 82 carries a stud-like restoring cam 84 and also carries a ramp-like retracting cam 86 both for cooperating, in a manner to be described, with means on the wiper bar 56 to turn it on the fixed end carrying the trunnions 76. By this means, the wiper bar is retracted from and restored to the advanced position.

A UHF-VHF changeover knob 88 has an associated shaft 90 conecting it to the rotary piece 82 for rocking the latter piece 82 into opposite positions. The associated shafts **44*a*, 72, and 90 are concentrically arranged in supporting relation one within the other, and support the knobs 50, 74, and 88** coaxially for independent rotation in fixed adjacent planes.

A C-spring 82 has a circular body section fitting within an annular recess 94 formed in the rotary piece 82. Each of the free ends of the circular body section integrally carries a first radially extending leg portion 96, a longitudinally extending second leg portion 98 disposed at right angles to the first leg portion, and a diagonally outwardly bent hook portion 100 at the end of the second leg portion 98 to retain the latter in the chassis. More particularly, the second portions 98 of the two legs pass through the arcuate slot 42 in the front chassis panel 32, and cooperate with the rotary piece 82 so as to enable the spring 92 to bias it toward a neutral or center position.

A pair of first cam means, referred to hereinafter, includes one radially disposed retracting cam 102 which is fast to the rear shaft section 44c and rotates with the selector section 46. Rotation of the selector section into the channel 1 position at a time when the wiper bar 56 is advanced, causes engagement between the cam 102 and a cam follower 104 on the wiper bar 56 to cam the wiper bar into a retracted position.

An insulating panel 106 carries the fixed or anchored ends of the wiper springs 54 and bridges between the front and rear panels 32 and 34 of the chassis in a closely spaced apart relation parallel to a top wall 108 of the chassis.

Figure 3:
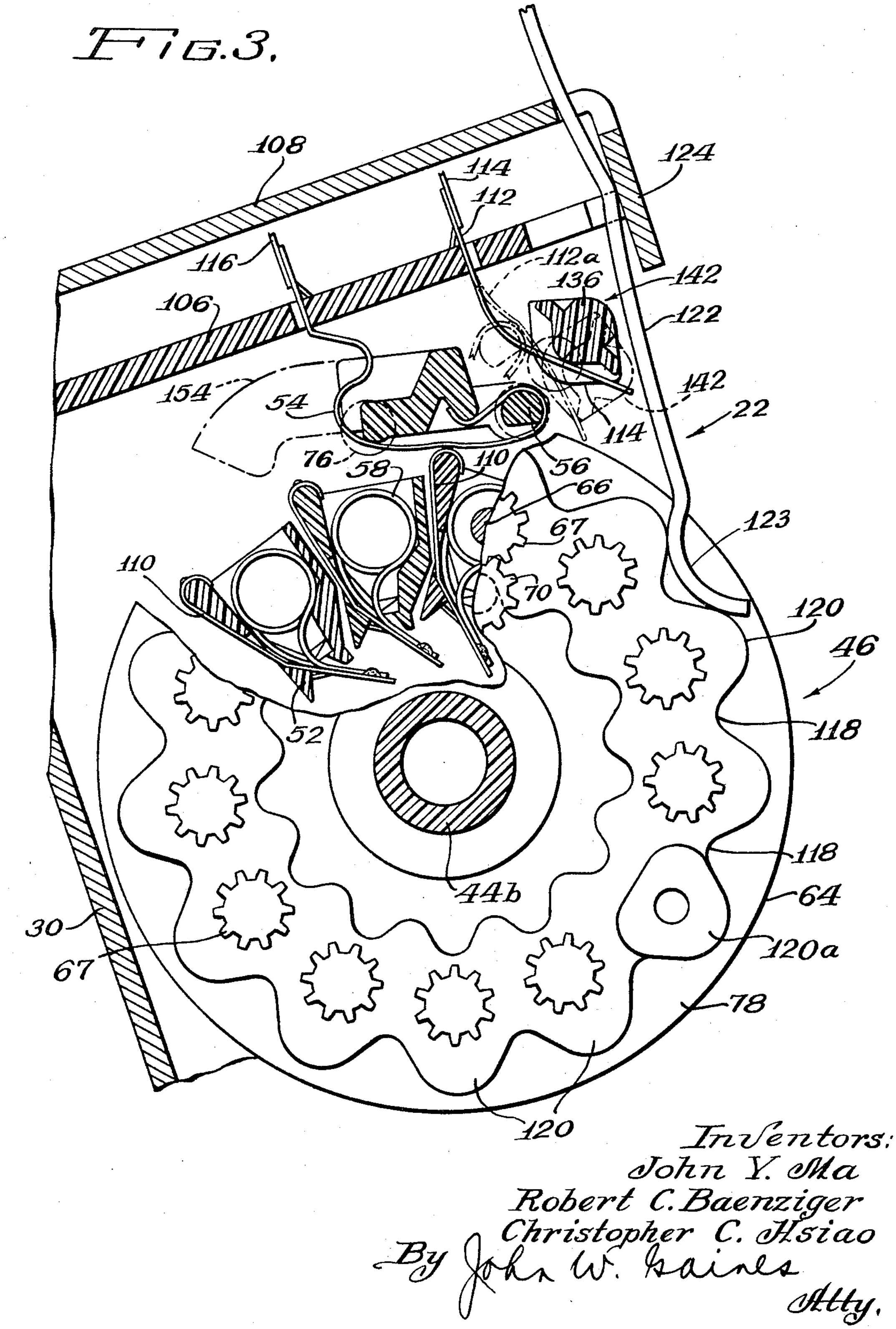
FIGURE 3 is a transverse sectional view taken along the lines III—III of FIGURE 2.

In FIGURE 3, the trough portion of each tuning strip 52 carries a coaxial series of the separate tuning coils 58, each provided with a pair of contact terminals 110 soldered to opposite ends of the coil and presenting radially projecting contacts.

The insulating panel 106, in addition to anchoring the row of wiper springs 54, also carries a row of spring strips forming UHF fixed terminals 112. The terminals 112 have wires 114 leading thereto from the UHF tuner circuits such as the oscillator and associated circuits. The wipers 54 have wires 116 leading therefrom to the so-called front end circuitry of the television receiver which is adapted to receive the tuned UHF or VHF incoming signals as appropriate.

Also in FIGURE 3, the non-free lateral end or longitudinal edge of the wiper bar 56 turns on an axis fixed by the center line of the wiper bar trunnions 76 so that the free end of the wiper bar can swing between an advanced position shown by the solid lines in FIGURE 3 and a retracted position shown by the broken lines 56a. In the retracted position, the wiper bar causes projecting contacts of the associated wiper springs 54 to deflect the UHF terminals 112 into the connected, signal transfer position shown by the dotted lines 112a in FIGURE 3. The tuned, incoming UHF signal is transmitted to the front end circuits of the television receiver while electrical contact is maintained between the wipers 54 and the terminals 112 When the wiper bar 56 is restored to the solid line position, the wiper springs 54 make electrical contact with the contacts presented by the contact terminals 110 on the selector section 46 so that a selected VHF tuning strip 52 is in signal transfer relation with the front end circuits of the receiver.

The indexing disk 78 comprises a row of recesses 118 alternating with a ring of restoring cams 120 constituting second cam means to control the wiper bar. A cam 120a operative in the top location in the channel 1 position of the selector section 46 constitutes both the front one of the pair of retracting cams in the first cam means as will be hereinafter described, and also functions in another position as a restoring cam of the second cam means just referred to.

An indexing arm 122 has an end with an arcuate nose 123 which is spring biased into the nearest confronting recess 118 upon termination of rotation of the selector section 46 so as to accurately index the uppermost tuning strip 52 with the wiper bar 56 when the wiper bar is in its advanced position. The opposite end of the arm 122 is anchored to the chassis in a position engaging both the top wall 108 and a short turned down edge of the top panel 108 forming a longitudinal wall 124 of the chassis.

In FIGURE 4, a short projecting stud at the rear end of the wiper bar 56 serves as a rear pin 126 for controlling turning movement of the wiper bar. A long protruding stud at the front of the wiper bar 56 projects through the front panel 32 of the chassis and forms a cam follower pin 128 controlled by the rotary device 82. The front retracting cam 120a of the first cam means operates a registering follower 130 carried by the wiper bar 156.

Details of the tuner switch contact arrangement of FIGURES 3 and 4, including the wiper bar construction, are described and claimed in the referred to copending application Ser. No. 408,064. Details of the tuning strip 52 and the drum turret employing the same in accordance with FIGURE 3 are described and claimed in the referred to copending application Ser. No. 414,297.

Figures 5, 6, 7:
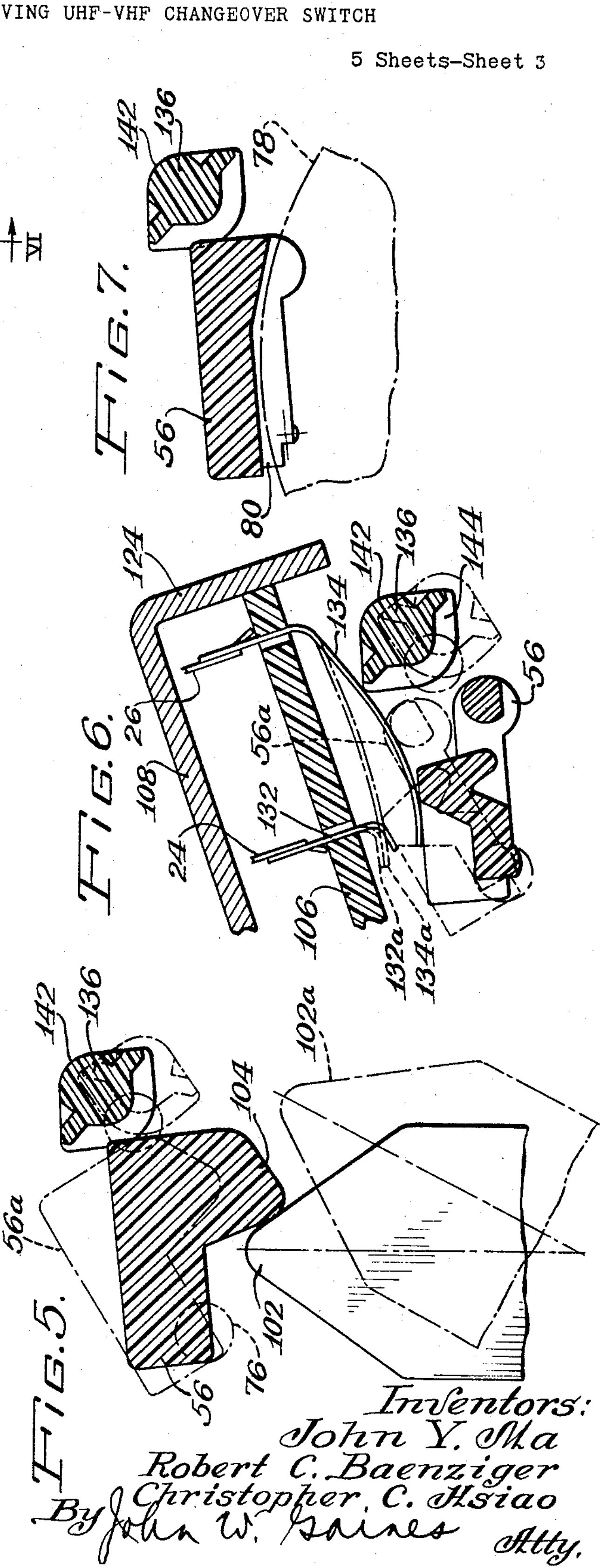

In FIGURE 5, the rear retracting cam 102 of the first cam means has a channel 1 position, not shown, intermediate the adjacent position thereto shown by solid lines in FIGURE 5 and the adjacent position thereto shown by the broken lines 102a. Movement of the cam 102 from either of the adjacent positions into the channel 1 position cams the follower 104 and moves the wiper bar 56 from the advanced position shown by solid lines into the retracted UHF position indicated by the broken lines 56a. When the cam 102 vacates the channel 1 position, it unblocks the follower 104 allowing the wiper bar 56 to be restored when desired to the advanced position.

In FIGURE 6, a terminal strip stub is secured to the insulating panel 106 and forms a fixed switch contact 132. The wire 24 leading from the indicator lamp bulb, not shown, is soldered to the upper end of the fixed contact. A long terminal strip is secured to the panel 106 and the free end thereof is a movable switch contact 134 which engages the wiper bar 56 and which cooperates with the contact 132 to form a closeable switch. The wire 26 leading from the low power AC source in the indicator circuit, not shown, is soldered to the movable switch contact 134. Retraction of the wiper bar 56 from the solid line position into the UHF position shown by the broken lines 56a moves the movable contact 134 into electrical contact with the fixed contact in their relative positions shown by the broken lines 132a and 134a. Illumination of the indicator signals that the tuner is in the UHF setting, and the circuit is opened when the wiper bar is restored to the advanced position.

FIGURE 7 illustrates the interfit between the indexing disk rim 78 shown in broken lines, and the receiving slot 80 which is formed transversely in the adjacent face of the wiper bar 56.

In FIGURE 8, the front retracting cam of the pair of first cam means has a channel 1 position, not shown, intermediate the adjacent position shown by solid lines in FIGURE 8 and an adjacent position shown by broken lines. Rotation of the cam through either of the latter positions into the channel 1 position causes engagement with the follower 130 and cams the wiper bar 56 from the advanced position shown by solid lines into the retracted position indicated by the broken lines 56a. The wiper bar can be restored when the retracting cam 120a vacates the channel 1 position.

In FIGURES 3, 9, and 11 respectively, a long straight center section 136, a front fork 138, and a rear fork 140 form integral sections of a toggle bar 142.

More particularly, the toggle bar 142 in FIGURE 3 is the back up member for the respective UHF terminals 112 aligned in a row on the panel 106. The straight central section 136 of the toggle bar has a row of transverse ribs 144 defining slots individual to the terminals and electrically insulating them one from the other. The front fork 138 (FIGURE 9) carries a longitudinally extending trunnion 146 which turns and slides in the shank of the T-slot 36a. The fork 138 receives the cam follower pin 128 and moves conjointly with the pin 128 as the latter slides between opposite ends of the cross bar of the T-slot 36a. A flat spring 148 biases the fork 138 with an over-center action against the cam follower pin 128, the spring 148 being anchored at one end in the longitudinal chassis wall 124 and being anchored at the other end in a short, longitudinally extending lug 32a integral with the chassis front panel 32.

The rear fork 140 (FIGURE 11) of the toggle bar 142 similarly cooperates with the projecting rear pin 126 on the wiper bar 56, the T-slot 36b similarly cooperates with the pin 126 and with a wiper bar trunnion 152 carried by the fork 140, and a flat spring 150 provides a similar toggle overcenter function so as to urge the pin 126 into either opposite end of the cross bar of the T-slot. In the described figures of the drawings immediately preceding, the wiper bar 56 is illustrated in the advanced position, and the toggle bar 142 has a corresponding advanced position.

In FIGURE 10, the wiper bar 56 and the toggle bar 142 are shown retracted into their UHF position, the parts of FIGURE 10 being otherwise the same as in FIGURE 9 preceding. An outrigger follower 154 which is integral with the wiper bar 56 occupies a confronting recess 118 so as to be aligned with the indexing disk 64 and in the path of the row of restoring cams 120 of the second cam means when the tuner parts occupy a UHF setting. From such setting, all that is necessary to restore the tuner to the VHF setting is to move the selector section 46 one step in either direction of rotation. The outrigger follower 154 is displaced by the first cam 120 which passes and which forces the wiper bar 56 to be restored to the VHF setting of FIGURES 3, 8, 9, and 11, except of course never if the position being assumed by the selector section is the channel 1 position.

In FIGURES 12, 13, and 14, the rotary piece has a neutral or center position indicated by various broken lines or solid lines all identified by the numeral 82. The C-spring 92 maintains the piece in such position, and the free leg portions 96 are mutually spaced apart at opposite ends of a cross bar 156 at the bottom of the rotary piece. Except in instances when the wiper bar occupies the channel 1 position, clockwise rotation of the piece from the broken line position 82, as viewed in FIGURE 12, causes the stud-like restoring cam 84 to engage the cam follower pin 128, forcing the wiper bar to be restored to its advanced VHF position. At that point, the circular body section of the C-spring 92 is contracted under compression because the right leg, as viewed in FIGURE 12, has been deflected clockwise from neutral position shown by the broken lines 96a into the collapsed, solid line position adjacent the opposite leg portion 96. The toggle bar 142 retains the wiper bar in its VHF position following release of the rotary piece by the viewer, whereas the C-spring 92 forces the rotary piece to resume neutral position.

Rotation of the rotary piece into its counter clockwise extreme position indicated by the solid lines 82b in FIGURE 13 causes the ramp-like retracting cam 86 to engage the cam follower pin 128 and retract the wiper bar into the UHF setting. The complete UHF circuitry is not shown, but is a well known form of tuner and in one preferred form would operate as a continuous UHF tuner. Operation of the rotary piece 82 into alternate extreme positions allows switching between the existing VHF channel setting and the existing UHF channel setting at the time of changeover.

As herein disclosed, the invention is shown to embody a step by step tuned VHF turret, augmented preferably by a continuous UHF tuner. It is evident that an augmenting UHF turret can satisfactorily be used instead of the continuous UHF tuner. The channel 1 position is used herein not in any literal sense but simply as an unambiguous term of convenience. In practice, channel selector knobs such as applicants' knob 50 are now commonly a plastic dial molded with a UHF graduation as one mark thereon followed by the numeral markings 2 to 13, consecutively. In the channel 1 position, the present tuner receives from the UHF tuner the UHF IF output, i.e., the signal resulting after the UHF incoming frequency has been converted by the UHF tuner to the intermediate frequency of the set.

We claim:

1. Tuning means for tuning a wave signal receiver, including:

generally parallel tuner sections operatively related with one being a bidirectionally settable, VHF section, another tuner section being a UHF section having a stationary position and a space between it and the selector section, and a third switch bar section intervening in said space, said switch bar section having advancingly and retractively shifted positions establishing cooperation with the respective UHF and VHF sections in alternation for UHF-VHF changeover;

means supporting the tuner sections in the operative relationship described;

said VHF selector section comprising a turret, with pluralities of aligned switch contacts, which is rotatably supported by said supporting means and which, when set selectively bidirectionally as aforesaid, moves a selected plurality of the aligned switch contacts into the shift path of the switch bar section for direct electrical engagement thereby; and hand operated rotary cam and associated follower means having a connection to the switch bar section for selectively shifting it into the advanced and retracted positions.

2. Tuning means for tuning a wave signal receiver, including:

generally parallel tuner sections operatively related with one being a bidirectionally settable, VHF selector section, another tuner section being a UHF section having a stationary position and a space between it and the selector section, and a third switch bar section intervening in said space, said switch bar section having advancingly and retractively shifted positions establishing cooperation with the respective UHF and VHF sections in alternation for UHF-VHF changeover;

means supporting the tuner sections in the operative relationship described; and hand operated rotary cam and associated follower means having a connection to the switch bar section for selectively shifting it into the advanced and retracted positions;

said rotary cam means comprising two cams on a common, knob controlled part, and engageable in opposite directions of rotation of the knob to cam said associated follower means in alternation with one another;

said follower means consisting of a follower common to the two cams, said switch bar section carrying the common follower and shifting therewith from each position into the other as the latter is being cammed.

3. The invention of claim 2, said selector and switch bar sections carrying respectively recesses and a confronting cam follower, which follower occupies the closest recess when the switch bar section is retracted into a position establishing the UHF operation; and cams on the selector section at opposite sides of each recess to displace the confronting cam follower from such recess in the selector section, said cams being responsive to either direction of movement of the selector section for camming the switch bar section.

4. Tuning means for tuning a wave signal receiver including:

plural tuner sections operatively related with one being a rotatable VHF selector section, another tuner section being a UHF section having a stationary position with a space between it and the selector section, and a third switch bar section intervening in said space, said switch bar section having advancingly and retractively shifted positions establishing cooperation with the respective VHF and UHF sections in alternation for UHF-VHF changeover;

a rotary piece independently rotatable with respect to the rotatable VHF selector section;

first shifting means carried in part by the selector section and in part by the switch bar section and establishing cooperation to shift the latter into the advanced and retracted positions;

second shifting means carried by the rotary piece and by the switch bar section and establishing cooperation to shift the latter into the retracted position;

first manual changeover control means comprising a first knob and a connecting shaft connected to the selector section for rotating same to cause the first shifting means selectively to shift the switch bar section as desired; and second manual changeover control means comprising a second knob and a connecting shaft connected to the rotary piece for rotating same to cause the second shifting means to shift the switch bar section in the manner described.

5. The invention of claim 4, the first knob and connecting shaft of the first control means, and the selector section being coaxial with respect to one another.

6. The invention of claim 5, the two connecting shafts being telescoped one within another so that one of the control means rotatably supports the other.

7. A tuner for tuning a wave signal receiver, comprising:

tuner sections which are operatively related with one being a selector section, another of which is advancingly and retractively shiftable with respect thereto, and a third tuner section which is stationary;

means supporting the tuner sections in the operative relationship described;

said shiftable section in the advanced position establishing cooperation with said selector section to provide a wave signal transfer function including a selectable portion of the selector section in an operative circuit of the receiver, said selector section having a nonoperative position;

the selector and shiftable sections carrying respectively first cam and associated follower means and carrying respectively second cam and associated follower means for mechanically controlling the shiftable section by cam action;

the first cam means comprising a single cam, said cam being carried by the selector section into a cam actuating relationship with the associated follower means at a time when the selector section is moved into the nonoperative position, so as to relatively retract the shiftable section at that time;

said shiftable section in the retracted position establishing cooperation with the stationary tuner section to provide a wave signal transfer function including the stationary section in an operative circuit of the receiver.

8. A tuner for tuning a wave signal receiver, comprising:

a pair of tuner sections operatively related with one being a selector section and the other advanceably and retractively movable with respect thereto for establishing switching cooperation with the selector section; and means supporting the sections in the operative relationship described, said selector section having a nonoperative position, said selector section also having operative channel selector positions and providing, in each of a plurality of said positions when operative, a wave signal transfer function in which a corresponding selectable portion of the section is included by the movable section in an operative circuit in the receiver;

the selector and movable sections carrying respectively first cam and associated follower means and carrying respectively second cam and associated follower means for mechanically controlling the movable section by cam action;

the respective advanceable and retractive movements of the movable section each displacing a different one of the associated follower means into the path of its cam means;

the first cam means comprising a single cam, said cam being carried by the selector section into camming relationship with the associated follower means, when the selector section is moved into the nonoperative position, so as to relatively retract the movable section at that time;

the second cam means comprising a row of cams and alternating recesses on the selector section, and interacting with the associated follower means which, when occupying any recess between two cams, is cammed by an appropriate one of the cams in either direction of movement of the selector section so as to relatively advance the movable section at that time and establish the wave signal transfer function as described.

9. A tuner for tuning a wave signal receiver, comprising:

tuner sections operatively related with one being a selector section, another which is advancingly and retractively shiftable with respect thereto, and a third tuner section which is stationary; and means supporting the tuner sections in the operative relationship described;

said shiftable section in the advanced position establishing cooperation with said selector section to provide a wave signal transfer function whereby the shiftable section connects a selected portion of the selector section in an operative circuit in the receiver;

said selector section comprising a turret, with plural portions, which is rotatably supported on the supporting means and which, when selectively set by rotation, moves the selected portion aforesaid into the shift path of the shiftable section; said plural portions each comprising a plurality of aligned switch contacts directly electrically engageable by a plurality of aligned switch contacts on the shiftable section to effect the connection aforesaid;

said shiftable section in the retracted position establishing cooperation with the stationary tuner section to provide a wave signal transfer function including the stationary section in an operative circuit of the receiver.

10. The invention of claim 9, further comprising:

actuable cam follower means carried by the shiftable section and a plurality of associated, operator controlled, rotary cams for actuating the follower means;

each respective direction of advance or retraction of the shiftable section displacing the actuable cam follower means into the path of at least one associated cam so that the section can be cammed when desired in the opposite direction.

11. The invention of claim 10, said rotary cams being carried by the selector section; and operator controlled means for rotating said cams comprising a channel selector knob drivingly connected to the selector section, said selector section being constructed, arranged, and operated by the knob to cam the shiftable section into either position desired.

12. A tuner for tuning a wave signal receiver, comprising:

tuner sections operatively related with one being a selector section, another which is advancingly and retractively shiftable with respect thereto, and a third tuner section which is stationary;

means supporting the tuner sections in the operative relationship described;

said shiftable section in the advanced position establishing cooperation with said selector section to provide a wave signal transfer function whereby the shiftable section connects a selected portion of the selector section in an operative circuit of the receiver;

said shiftable section in the retracted position establishing cooperation with the stationary tuner section to provide a wave signal transfer function including the stationary section in an operative circuit of the receiver;

actuable cam follower means carried by the shiftable section and a plurality of associated, operator controlled, rotary cams for actuating the follower means;

each respective direction of advance or retraction of the shiftable section displacing the actuable cam follower means into the path of at least one associated cam so that the section can be cammed when desired in the opposite direction;

said rotary cams being carried by the selector sections;

operator controlled means for rotating said cams comprising a channel selector knob drivingly connected to the selector section, said selector section being constructed, arranged, and operated by the knob to cam the shiftable section into either position desired;

an indexing disk on said selector section constituting a set of the operator controlled rotary cams, the cams of said set alternating with recesses;

one cam follower means on the shiftable section having a displaced position received in a confronting recess at one point in the path of rotation of the cams on the indexing disk; and a detent at another point in the path of rotation of the indexing disk cams for yieldably seating in the confronting recess so as to index the selector section when the disk stops rotating.

13. The invention of claim 11, further comprising:

a disk on said selector section including thereon a set of the operator controlled rotary cams, the cams of said set alternating with recesses;

one cam follower means on the shiftable section having a displaced position received in a confronting recess at one point in the path of rotation of the cams on the indexing disk; and a cam arm on said selector section, one of the cam follower means on the shiftable section having a displaced position in the path of rotation of the cam arm;

said disk and said cam arm being on the selector section at opposite ends from one another, and engaging the associated follower means each to cause camming of the shiftable section in an opposite direction from the other.

14. A tuner for tuning a wave signal receiver, comprising:

a pair of generally parallel tuner sections operatively related with one being a rotatable selector section, and the other being shiftable between opposite positions, in one of which positions the shiftable section is adjacent to and establishes switching cooperation with the selector section;

means supporting the sections in the operative relationship described, said selector section having operative channel selector positions and providing in each of a plurality of said positions when operative, a wave signal transfer function in which a corresponding selectable portion of the section is included by the shiftable section in an operative circuit in the receiver;

a rotary piece independently rotatable with respect to the selector section;

said rotary piece and the shiftable section carrying respective cam means and follower means which establish cooperation such that rotation of the rotary piece in opposite directions cams the shiftable section into its opposite positions; and a ring of cams on the rotatable selector section;

said shiftable section carrying a cam follower which in one position of the shiftable section has a displaced position in the path of and between the two nearest cams in the ring on the selector section, such that initial rotation of the selector section in either direction cams the follower from its displaced position, shifting the shiftable section from said one position to the opposite position.

15. Tuning means for a wave signal receiver, comprising:

tuner sections operatively related with one being a rotatably mounted VHF selector section, another tuner section being a stationary UHF section with a space between it and the rotatable section, and a section intervening in said space and adapted to form a coupling to an operative circuit in the receiver, the last said section being a shiftable section having advancingly and retractively shifted position establishing cooperation with the respective UHF and VHF sections in alternation for UHF-VHF changeover;

means supporting the tuner sections in the operative relationship described;

cam and follower means which are operatively between the rotatable section and the shiftable section and which when engaged during selected rotational positioning of the rotatable section cause the shiftable section to shift between its opposite positions;

a rotary piece separate from the rotatable section;

cam and follower means which are operatively between the rotary piece and the shiftable section and which when engaged during selected rotational positioning of the rotary piece cause the shiftable section to shift between its opposite positions; and first and second knobs having associated shafts, one associated shaft connecting the first knob in one location to the rotatable section for mechanically controlling the position of the shiftable section and UHF-VHF changeover by cam action, one associated shaft connecting the second knob in an adjacent location to the rotary piece for mechanically controlling the position of the shiftable section for UHF-VHF changeover by cam action;

the associated shafts for the knobs being arranged in concentric relation one within another for mounting the respective first and second knobs in their mutually adjacent locations for independent rotation coaxially with respect to one another.

16. Tuning means for a wave signal receiver, comprising:

generally parallel tuner sections operatively related with one being a rotatably mounted VHF selector section, another tuner section being a stationary UHF section with a space between it and the rotatable section, and a section intervening in said space and adapted to form a coupling to an operative circuit in the receiver, the last said section being a shiftable section having advancingly and retractively shifted positions establishing cooperation with the respective UHF and VHF sections in alternation for UHF-VHF changeover;

means supporting the tuner sections in the operative relationship described;

cam and follower means which are operatively between the rotatable section and the shiftable section and which when engaged during selected rotational positioning of the rotatable section cause the shiftable section to shift between its opposite positions;

a rotary piece separate from the rotatable section;

cam and follower means which are operatively between the rotary piece and the shiftable section and which when engaged during selected rotational positioning of the rotary piece cause the shiftable section to shift between its opposite positions;

pretuning mechanism having means for coupling it to the rotatable section in at least a plurality of the rotatable positions of the latter for pretuning selectable VHF portions of the rotatable section; and first, second, and third knobs having associated shafts, one associated shaft connecting the first knob in one location to the rotatable section for mechanically controlling the position of the shiftable section and UHF-VHF changeover by cam action, one associated shaft connecting the second knob in an adjacent location to the rotary piece for mechanically controlling the position of the shiftable section for UHF-VHF changeover by cam action, and one associated shaft connecting the third knob in an adjacent location to the pretuning mechanism for pretuning the rotatable section in the manner described;

the associated shafts for the knobs being arranged in concentric relation one within another for mounting the respective first, second, and third knobs in their mutually adjacent locations for independent rotation coaxially with respect to one another.

17. Multisection tuning means for tuning a wave signal receiver, having:

a VHF selector section in operative relation to the tuning means so as to rotate on a longitudinal axis into channel selector positions;

a transversely aligned UHF section having a stationary, longitudinally disposed position parallel to the VHF section and operatively related with a transverse space between it and the VHF section;

a switch bar section operatively related parallel to the VHF and UHF sections so as to intervene in the space therebetween;

a chassis for the tuning means;

means connected to the chassis supporting the tuning sections in the operative relationship described, including trunnions carried by a non-free lateral end of the switch bar section, and mounting it to the chassis for turning movement of the switch bar section in a path defining end positions in which the switch bar section establishes cooperation with the UHF and VHF sections in alternation for UHF-VHF changeover;

a toggle bar connected to the free lateral end of the switch bar section for biasing it into either end position into which the switch bar is being changed; and constraining means between the chassis, and the switch bar section and toggle bar effective for limiting turning movement of the switch bar section as it reaches the end positions in its path.

18. The invention of claim 17, wherein the last named means comprises T-slot means disposed one at each free lateral end of the switch bar section and formed in an adjacent portion of the chassis at that end;

trunnions carried by the toggle bar for turning and sliding movement within the T-slot means; and protrusion means carried by the free lateral end of the switch bar section, and sliding between opposite ends of a slot defined by the T-slot means to limit turning movement of the switch bar section in the described manner.

19. Means connected to the front end circuitry of a wave signal receiver which comprises tuning means for tuning the receiver, and including:

generally parallel tuner sections operatively related with one being a rotatable VHF selector section, another tuner section which is a stationary UHF panel having a space between it and the selector section, and a third section which is a changeover switch bar intervening in said space, said switch bar being electrically included in a front end circuit of the receiver, and having advancingly and retractively shifted positions in which it alternatively couples the respective VHF section and UHF panel in signal transfer relation;

means supporting the sections enumerated in the operative relationship described;

said rotatable VHF selector section comprising a turret which is provided with pluralities of aligned switch contacts and which, when rotated, moves a selected plurality of the aligned switch contacts into the shift path of the changeover switch bar for direct electrical engagement thereby to effect the coupling aforesaid;

there being a protruding actuator portion at one longitudinal end of the switch bar extending beyond a corresponding end of the selector section;

a UHF indicator which is includable in a closed part of an indicator circuit with an energy source and which when energized displays an indicator signal; and means in an open part of the same circuit and actuable by the protruding portion aforesaid to complete said indicator circuit when the switch bar is retracted into its position coupling the UHF panel in signal transfer relation.

20. The invention of claim 19, wherein the last named means comprises:

a first contact for connection to the indicator and a second contact for connection to the energy source, one of the two contacts being movable;

said movable contact being engaged by the protruding portion so as to take a corresponding position contacting the other contact when the switch bar shifts into the retracted position.

References Cited

UNITED STATES PATENTS 2,839,936 6/1958 Dawson ............ 334—51 X

HERMAN KARL SAALBACH, *Primary Examiner.*

S. CHATMON, Jr., *Assistant Examiner.*